(12) United States Patent
Sherif et al.

(10) Patent No.: US 9,758,849 B2
(45) Date of Patent: Sep. 12, 2017

(54) BEARING STEEL COMPOSITION

(71) Applicant: Aktiebolaget SKF, Gothenburg (SE)

(72) Inventors: Mohamed Sherif, Utrecht (NL); John Beswick, Montfoort (NL)

(73) Assignee: AKTIEBOLAGET SKF, Gothenburg (SE)

( * ) Notice: Subject to any disclaimer, the term of this patent is extended or adjusted under 35 U.S.C. 154(b) by 106 days.

(21) Appl. No.: 14/379,070

(22) PCT Filed: Feb. 13, 2013

(86) PCT No.: PCT/EP2013/052881
§ 371 (c)(1),
(2) Date: Aug. 15, 2014

(87) PCT Pub. No.: WO2013/120903
PCT Pub. Date: Aug. 22, 2013

(65) Prior Publication Data
US 2016/0047020 A1 Feb. 18, 2016

(30) Foreign Application Priority Data
Feb. 15, 2012 (WO) ............... PCT/EP2012/052585

(51) Int. Cl.
| | | |
|---|---|---|
| *C22C 38/44* | (2006.01) | |
| *C22C 38/46* | (2006.01) | |
| *C21D 9/40* | (2006.01) | |
| *C23C 8/22* | (2006.01) | |
| *C21D 6/00* | (2006.01) | |
| *C22C 33/02* | (2006.01) | |
| *F16C 33/62* | (2006.01) | |
| *B22F 3/26* | (2006.01) | |
| *C23C 8/32* | (2006.01) | |
| *F16C 33/32* | (2006.01) | |
| *F16C 33/34* | (2006.01) | |

(52) U.S. Cl.
CPC ............... *C22C 38/46* (2013.01); *B22F 3/26* (2013.01); *C21D 6/00* (2013.01); *C21D 9/40* (2013.01); *C22C 33/0278* (2013.01); *C22C 38/44* (2013.01); *C23C 8/22* (2013.01); *C23C 8/32* (2013.01); *F16C 33/62* (2013.01); *F16C 33/32* (2013.01); *F16C 33/34* (2013.01); *F16C 2204/62* (2013.01); *F16C 2223/12* (2013.01)

(58) Field of Classification Search
CPC .............................. C22C 38/44; C22C 38/46
USPC ......................... 148/206, 223, 319, 333–335
See application file for complete search history.

(56) References Cited

U.S. PATENT DOCUMENTS

| | | |
|---|---|---|
| 4,484,959 A | 11/1984 | Boucher et al. |
| 4,778,522 A | 10/1988 | Maki et al. |
| 7,018,107 B2 | 3/2006 | Beswick et al. |
| 2002/0124911 A1* | 9/2002 | Hetzner ............ C22C 38/22 148/233 |

FOREIGN PATENT DOCUMENTS

| | | | | |
|---|---|---|---|---|
| EP | 0739994 A1 | 10/1996 | | |
| JP | H05125497 A | 5/1993 | | |
| JP | EP 2006398 A1 * | 12/2008 | ............... | C21D 1/26 |

* cited by examiner

*Primary Examiner* — Brian Walck
(74) *Attorney, Agent, or Firm* — Bryan Peckjian; SKF USA Inc. Patent Dept.

(57) ABSTRACT

A bearing steel composition contains 0.1 to 0.2 wt % C, 3.25 to 4.25 wt % Cr, 9.5 to 11.5 wt % Mo, 5.75 to 6.75 wt % W, 1.5 to 2.5 wt % V, and 2.5 to 3.5 wt % Ni. A bearing component, such as a rolling element, an inner race or outer race, is formed from the bearing steel composition, for example, by a powder metallurgical technique and then is subjected to a case hardening treatment. The bearing component may have a microstructure composed of martensite, retained austenite and at least one of carbides and/or carbonitrides. The carbon level at the surface of the bearing component may be 0.5 to 1.1 wt %.

20 Claims, No Drawings

BEARING STEEL COMPOSITION

CROSS REFERENCE TO RELATED APPLICATIONS

This is a National Stage application claiming the benefit of International Application Number PCT/EP2013/052881 filed on 13 Feb. 2013, which claims the benefit of International Application Number PCT/EP2012/052585 filed on 15 Feb. 2012, both of which are incorporated herein by reference in their entireties.

TECHNICAL FIELD

The present invention relates to the field of steels and bearings. More specifically, the present invention relates to a novel bearing steel composition, a method of forming a bearing component and a bearing comprising such a component.

TECHNICAL FIELD

The present invention relates to the field of steels and bearings. More specifically, the present invention relates to a novel bearing steel composition, a method of forming a bearing component and a bearing comprising such a component.

BACKGROUND

Bearings are devices that permit constrained relative motion between two parts. Rolling element bearings comprise inner and outer raceways and a plurality of rolling elements (balls or rollers) disposed therebetween. For long-term reliability and performance it is important that the various elements have a high resistance to rolling contact fatigue, wear and creep.

Conventional techniques for manufacturing metal components involve hot-rolling or hot-forging to form a bar, rod, tube or ring, followed by a soft forming process to obtain the desired component.

Surface hardening processes are well known and are used to locally increase the hardness of surfaces of finished components so as to improve, for example, wear resistance and fatigue resistance. A number of surface or case hardening processes are known for improving rolling contact fatigue performance.

An alternative (or addition) to case-hardening is through-hardening. Through-hardened components differ from case-hardened components in that the hardness is uniform or substantially uniform throughout the component. Through-hardened components are also generally cheaper to manufacture than case-hardened components because they avoid the complex heat-treatments associated with carburizing, for example. For through-hardened bearing steel components, two heat-treating methods are available: martensite hardening or austempering. Component properties such as toughness, hardness, microstructure, retained austenite content, and dimensional stability are associated with or affected by the particular type of heat treatment employed.

The martensite through-hardening process involves austenitising the steel prior to quenching below the martensite start temperature. The steel may then be low-temperature tempered to stabilize the microstructure.

The bainite through-hardening process involves austenitising the steel prior to quenching above the martensite start temperature. Following quenching, an isothermal bainite transformation is performed. Bainite through-hardening is sometimes preferred in steels instead of martensite through-hardening. This is because a bainitic structure may possess superior mechanical properties, for example toughness and crack propagation resistance.

Numerous conventional heat-treatments are known for achieving martensite through-hardening and bainite through-hardening.

WO 01/79568 and U.S. Pat. No. 7,018,107 describe methods for the production of a part for a rolling bearing.

It is an objective of the present invention to address or at least mitigate some of the problems associated with prior art and to provide a bearing steel composition and component formed therefrom that exhibits at least one of high abrasive wear resistance, high local toughness, and resistance to crack growth.

SUMMARY

In a first aspect, the present invention provides a bearing steel composition comprising:
(a) from 0.1 to 0.2 wt % C,
(b) from 3.25 to 4.25 wt % Cr,
(c) from 9.5 to 11.5 wt % Mo,
(d) from 5.75 to 6.75 wt % W,
(e) from 1.5 to 2.5 wt % V,
(f) from 2.5 to 3.5 wt % Ni,
(g) optionally one or more of the following elements
from 0-1 wt. % Mn,
from 0-1 wt. % N,
from 0-1 wt. % Si,
from 0-1 wt. % Co,
from 0-1 wt. % Al,
from 0-0.1 wt. % S,
from 0-0.1 wt. % P,
from 0-0.1 wt. % O, and
(h) the balance iron, together with unavoidable impurities.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The steel composition preferably comprises from 0.12 to 0.18 wt % C, more preferably from 0.14 to 0.16 wt % C, still more preferably about 0.15 wt % C. In combination with the other alloying elements, this results in the desired microstructure and mechanical properties, particularly hardness. Carbon acts to lower the bainite transformation temperature.

The steel composition preferably comprises from 3.4 to 4.1 wt % Cr, more preferably from 3.7 to 3.8 wt % Cr, still more preferably about 3.75 wt % Cr. Chromium acts to increase hardenability and reduce the bainite start temperature. Chromium also provides an improved corrosion resistance property to the steel.

The steel composition preferably comprises from 10 to 11 wt % Mo, more preferably from 10.2 to about 10.8 wt % Mo, still more preferably about 10.5 wt % Mo. Molybdenum acts to avoid austenite grain boundary embrittlement owing to impurities such as, for example, phosphorus. Molybdenum also acts to increase hardenability and reduce the bainite start temperature. Molybdenum imparts toughness for heavy service, and provides especially heat-resistant alloys.

The steel composition preferably comprises from 6 to 6.5 wt % W, more preferably from 6.2 to 6.3 wt % W, still more preferably about 6.25 wt % W. In combination with the other alloying elements and C, this results in the desired microstructure and mechanical properties, particularly hardness.

The steel composition preferably comprises from 1.7 to 2.3 wt % V, more preferably from 1.8 to 2.2 wt % V, still more preferably about 2 wt % V. In combination with the other alloying elements and C, this results in the desired microstructure and mechanical properties, particularly hardness.

The steel composition preferably comprises from 2.7 to 3.3 wt % Ni, more preferably from 2.8 to 3.2 wt % Ni, still more preferably about 3 wt % Ni. In combination with the other alloying elements and C, the presence of Ni in this range has been found to suppress the formation a brittle phase, thought to be an intermetallic Laves phase. Such a brittle phase is undesirable and may give rise to grain-boundary embrittlement problems. Thus, the presence of Ni in the steel composition according to the present invention serves to improve the mechanical properties of the alloy.

The alloy may optionally contain one or more Mn, N, Si, Co and Al. S, P and O may also be present in small amounts.

Preferably the iron forms the balance of the composition, together with unavoidable impurities.

An Example of a steel composition according to the present invention is an alloy comprising about 0.15 wt. % C, about 3.75 wt. % Cr, about 10.50 wt. % Mo, about 6.25 wt. % W, about 2.0 wt. % V and about 3.0 wt. % Ni, and the balance being iron together with any unavoidable impurities.

It will be appreciated that the steel for use in the bearing component according to the present invention may contain unavoidable impurities, although, in total, these are unlikely to exceed 0.5 wt. % of the composition. Preferably, the alloys contain unavoidable impurities in an amount of not more than 0.3 wt. % of the composition, more preferably not more than 0.1 wt. % of the composition. With regard to any phosphorous and sulphur and oxygen, the content of these three elements is preferably kept to a minimum.

The alloys according to the present invention may consist essentially of the recited elements. It will therefore be appreciated that in addition to those elements which are mandatory other non-specified elements may be present in the composition provided that the essential characteristics of the composition are not materially affected by their presence.

The microstructure and resulting mechanical properties lead to improved rolling contact fatigue performance in the bearing component.

In a second aspect, the present invention provides a bearing component formed from a steel composition as herein described. The bearing component can be at least one of a rolling element (for example ball or roller element), an inner ring, and an outer ring. The bearing component could also be part of a linear bearing such as ball and roller screws.

At least a wear portion of the bearing component is formed by the method or made of the steel composition as herein described. The wear portion, for example, the raceway of a bearing ring, may be formed separately from the body of the bearing ring and then joined by conventional joining techniques such as diffusion joining or welding.

The bearing component is preferably formed by a powder metallurgical technique. This route is advantageous for high temperature bearing applications.

A surface of the bearing component is preferably case hardened by carburizing and also optionally nitriding.

In a third aspect, the present invention provides a bearing comprising a bearing component as herein described. Such a bearing may be used in many different types of machinery to retain and support rotating components.

According to a fourth aspect, the present invention provides a process for the manufacture of a bearing component, the process comprising:
 (i) providing a bearing steel composition as herein described;
 (ii) forming a bearing component from the bearing steel composition by a powder metallurgical technique; and
 (iii) case hardening the component by performing a carburizing treatment in a gas furnace or vacuum furnace at a temperature of from 900 to 980° C.

The carbon level at the surface of the component following the carburizing treatment is preferably from 0.5 to 1.1 wt %, more preferably from 0.7 to 0.9 wt %.

The carburizing treatment in a gas furnace or vacuum furnace is preferably carried out at a temperature of from 925 to 955° C. or from 927 to 954° C.

In one embodiment, the carburizing treatment comprises vacuum carburizing using either propane or acetylene as an enriching gas. In another embodiment, the carburizing treatment comprises gas carburizing using propane or natural gas as an enriching gas.

Following the carburizing treatment, the component may be quenched or slow cooled. If the component is quenched, then a stress relief may be carried out, for example at temperature of from 600° C. to 700° C. for typically from 3 to 5 hours, more preferably at about 650° C. for from 2 to 4 hours.

The process will typically further comprise the step of hardening the component, preferably using either a salt bath or a vacuum furnace. The process may also further comprise the step of preheating the component at a temperature of 800° C. or higher, preferably 843° C. or higher. The preheating step equalizes the temperature and minimize stress during subsequent heating. Preheat times are generally from 5 to 10 minutes.

The process will typically further comprise the step of austenitizing the component. Austenitizing temperatures are typically in the range of from 1050° C.-1120° C., preferably from 1075° C.-1095° C., more preferably from 1076° C.-1093° C. Austenitizing times typically vary from about 3 to 10 minutes in salt to about 20 to 30 minutes in vacuum. Salt bath operations result in quenching in salt, whereas vacuum processing quench cycles are typically performed in nitrogen. The pressure during gas quenching typically varies from 2 to 6 bar.

The process according to the present invention may further comprise the step of tempering, which may be performed a number of times, to obtain lower amounts of retained austenite and increase the hardness of the component. Tempering is typically performed at a temperature of from 535 to 545° C. In addition, the process may involve a deep freeze step, for example a deep freeze before and after the first temper and performed at temperatures from −75° C. and −150° C. for from 1-2 hrs.

Prior to hardening, the steel according to the present invention will typically comprise austenite as the predominant phase. When the steel composition is subjected to hardening and tempering it will exhibit a tempered martensite structure with some retained austenite as well as carbides/carbonitrides. The phases and structures of steel are well known in the art.

If austenite is cooled slowly, then the structure can break down into a mixture of ferrite and cementite (usually in the structural forms pearlite or bainite). Rapid cooling can result in martensite being formed. The rate of cooling determines the relative proportions of these phases and therefore the mechanical properties (e.g. hardness, tensile strength) of the steel. Quenching (to induce martensitic transformation), followed by tempering (to break down some martensite and retained austenite, as well as to precipitate some carbides/carbonitrides), is the most common heat treatment for high-performance steels. Deep cooling treatments after hardening and/or tempering stage(s) may also be applied.

For bearing applications the steel composition of the present invention may have a microstructure comprising martensite, any retained austenite and precipitated carbides and/or carbonitrides.

The method employed in the present invention is a form of powder metallurgy. Powder metallurgy typically relies on a forming and fabrication technique comprising three major processing stages:—

Powdering: the material to be handled is physically powdered and divided into many small individual particles.

Moulding: the powder is injected into a mould or passed through a die to produce a weakly cohesive structure close in dimension to the desired product.

Compression: the moulded article is subjected to compression and optionally high temperature to form the final article.

The method of the present invention forms at least a wear portion of a bearing component from a bearing steel composition as set out above.

The composition used in the method preferably corresponds to the composition of the final article produced. However, while the weight percentage of most of the elements will remain essentially constant, the nitrogen content may decrease slightly, perhaps due to degassing. Also the carburizing step will result in an increased carbon concentration in the surface region of the component.

It is preferred that the powdered steel composition is first formed by conventional techniques, for example, by melting suitable ingredients in a melting crucible. The melted components can then be powdered for use in the method of the present invention. Suitable ingredients include the raw elements or oxides or salts of the ingredients which can be decomposed on heating. The ingredients are preferably melted at a temperature in excess of 1500° C. to ensure that the composition is fully molten. If the temperature is lower then precipitation of a solid fraction such as δ-ferrite or the like may occur.

The melt can be produced in an induction furnace and/or tapped into an induction heated ladle where further alloying elements can be added in a protective atmosphere. The melt can be stirred and temperature controlled throughout the process. Prior to the atomisation the melt can be tapped into a tundish where the melt is protected by, for example, a protective slag cover or an inert atmosphere.

Each of the powder metallurgical steps is conventional in the art.

The process of the present invention may also involve a nitriding step. That is, the process may comprise a duplex heat treatment including nitriding.

The process of the present invention may further comprise finishing steps and/or tempering and/or annealing steps. In addition to the deep cooling treatment mentioned above, another possible step can be stress relief annealing of a hardened article. Depending on the type of material and the application, the products may be heat treated, machined and subjected to various types of quality control, such as ultrasonic inspection, dye penetrant testing and testing of mechanical properties.

The method and composition of the present invention can be used to produce steel products such as bearing components. The bearing component will typically have been formed by a process involving hardening and tempering. As a consequence, the microstructure will generally comprise martensite, together with any retained austenite and perhaps also carbides and/or carbonitrides. In one embodiment, the bearing component may be substantially austenitic with just the surface wear portion subjected to martensitic through-hardening. Alternatively, the whole product may be tempered and hardened by conventional methods to produce a martensitically hardened product.

The carburizing step results in an increased carbon concentration in the surface region of the component and an increase in the surface hardness of the component. An optional nitriding step may also be preformed also for the purpose of increasing the surface hardness of the component.

The high surface hardness improves long rolling contact fatigue strength life at low and high temperatures.

The invention claimed is:

1. A bearing steel composition comprising:
   0.1 to 0.2 wt % C,
   3.25 to 4.25 wt % Cr,
   10.2 to 11.5 wt % Mo,
   5.75 to 6.75 wt % W,
   1.5 to 2.5 wt % V,
   2.5 to 3.5 wt % Ni,
   0 to 1 wt. % Mn,
   0 to 1 wt. % N,
   0 to 1 wt. % Si,
   0 to 1 wt. % Co,
   0 to 1 wt. % Al,
   0 to 0.1 wt. % S,
   0 to 0.1 wt. % P,
   0 to 0.1 wt. % O, and
   the balance being iron, and unavoidable impurities.

2. The bearing steel composition as claimed in claim 1 comprising 0.12 to 0.18 wt % C.

3. The bearing steel composition as claimed in claim 1 comprising 3.4 to 4.1 wt % Cr.

4. The bearing steel composition as claimed in claim 1 comprising 10.2 to 11 wt % Mo.

5. The bearing steel composition as claimed in claim 1 comprising 6 to 6.5 wt % W.

6. The bearing steel composition as claimed in claim 1 comprising 1.7 to 2.3 wt % V.

7. The bearing steel composition as claimed in claim 1 comprising 2.7 to 3.3 wt % Ni.

8. The bearing steel composition as claimed in claim 1 comprising about 0.15 wt. % C, about 3.75 wt. % Cr, about 10.50 wt. % Mo, about 6.25 wt. % W, about 2.0 wt. % V and about 3.0 wt. % Ni, the balance being iron and unavoidable impurities.

9. A bearing component formed from a bearing steel composition comprising:
   0.1 to 0.2 wt. % C,
   3.25 to 4.25 wt. % Cr,
   9.5 to 11.5 wt. % Mo,
   5.75 to 6.75 wt. % W,
   1.5 to 2.5 wt. % V,
   2.5 to 3.5 wt. % Ni,
   0 to 1 wt. % Mn,
   0 to 1 wt. % N,
   0 to 1 wt. % Si,
   0 to 1 wt. % Co,
   0 to 1 wt. % Al, 0 to 0.1 wt. % S,
0 to 0.1 wt. % P,
0 to 0.1 wt. % O, and
the balance being iron, and unavoidable impurities,
wherein the bearing component is a rolling element, an inner ring, or an outer ring; and
the bearing component has a microstructure composed of martensite, retained austenite and at least one of carbides and/or carbonitrides.

10. The bearing component as claimed in claim 9, wherein the bearing component is formed by a powder metallurgical technique.

11. The bearing component as claimed in claim 9, wherein a surface of the bearing component has been case hardened by carburizing and/or nitriding.

12. The bearing component as claimed in claim 11, wherein the carbon level at the surface of the bearing component is 0.5-1.1 wt %.

13. A process for manufacturing the bearing component according to claim 9, the process comprising:
forming the bearing component according to claim 9 by a powder metallurgical technique; and
case hardening the bearing component by performing a carburizing treatment in a gas furnace or vacuum furnace at a temperature of 900 to 980° C.

14. The process as claimed in claim 13, wherein the carburizing treatment comprises vacuum carburizing using propane or acetylene as an enriching gas.

15. The process as claimed in claim 13, wherein the carburizing treatment comprises gas carburizing using propane or natural gas as an enriching gas.

16. The process as claimed in claim 13, wherein the carbon level at the surface of the component following the carburizing treatment is 0.5 to 1.1 wt %.

17. The bearing steel composition as claimed in claim 2 comprising:
3.4 to 4.1 wt % Cr,
10.2 to 11 wt % Mo,
6 to 6.5 wt % W,
1.7 to 2.3 wt % V, and
2.7 to 3.3 wt % Ni.

18. The bearing steel composition as claimed in claim 17 comprising:
0.14 to 0.16 wt % C,
3.7 to 3.8 wt % Cr,
10.2 to 10.8 wt % Mo,
6.2 to 6.3 wt % W,
1.8 to 2.2 wt % V, and
2.8 to 3.2 wt % Ni.

19. The bearing component as claimed in claim 9, wherein:
the carbon level at the surface of the bearing component is 0.5 to 1.1 wt %.

20. A bearing component composed of a bearing steel composition comprising:
0.1 to 0.2 wt. % C,
3.25 to 4.25 wt. % Cr,
9.5 to 11.5 wt. % Mo,
5.75 to 6.75 wt. % W,
1.5 to 2.5 wt. % V,
2.5 to 3.5 wt. % Ni,
0 to 1 wt. % Mn,
0 to 1 wt. % N,
0 to 1 wt. % Si,
0 to 1 wt. % Co,
0 to 1 wt. % Al,
0 to 0.1 wt. % S,
0 to 0.1 wt. % P,
0 to 0.1 wt. % O, and
the balance being iron, and unavoidable impurities,
wherein:
the bearing component is a rolling element, an inner ring, or an outer ring; and
the bearing component has a microstructure primarily composed of martensite.

* * * * *